(12) United States Patent
Hatakeyama (10) Patent No.: US 8,532,451 B2
(45) Date of Patent: Sep. 10, 2013

(54) OPTICAL TRANSMITTER

(75) Inventor: Tomoyuki Hatakeyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 264 days.

(21) Appl. No.: 13/022,878

(22) Filed: Feb. 8, 2011

(65) Prior Publication Data

US 2011/0194859 A1 Aug. 11, 2011

(30) Foreign Application Priority Data

Feb. 9, 2010 (JP) ................................. 2010-026939

(51) Int. Cl.
*G02B 6/26* (2006.01)
*G02B 6/42* (2006.01)

(52) U.S. Cl.
USPC .................. 385/43; 385/15; 385/31; 385/32; 385/39; 385/42; 385/45; 385/50; 385/51

(58) Field of Classification Search
USPC .............................................. 385/39, 43, 45
See application file for complete search history.

(56) References Cited

FOREIGN PATENT DOCUMENTS

| JP | 2005-283917 | 10/2005 |
| WO | WO 2008155548 A1 * | 12/2008 |

* cited by examiner

*Primary Examiner* — Ryan Lepisto
(74) *Attorney, Agent, or Firm* — Scully, Scott, Murphy & Presser, P.C.

(57) ABSTRACT

An optical transmitter includes three or more emission optical fibers that are three-dimensionally arranged, a single reception optical fiber, and an optical path converting component to optically couple the emission optical fibers to the reception optical fiber. The optical path converting component includes optical transmission portions that are optically coupled to the three or more emission optical fibers one to one, respectively, and optically coupled commonly to the single reception optical fiber. Entry ends of the optical transmission portions are aligned with exit ends of the three or more emission optical fibers, respectively. Exit ends of the optical transmission portions are aligned, as a whole, with an entry end of the single reception optical fiber. The exit ends of the optical transmission portions are arranged substantially parallel to one another and in closer proximity to one another than the entry ends of the optical transmission portions.

5 Claims, 9 Drawing Sheets

OPTICAL TRANSMITTER

CROSS-REFERENCE TO RELATED APPLICATIONS

This application is based upon and claims the benefit of priority from prior Japanese Patent Application No. 2010-026939, filed Feb. 9, 2010, the entire contents of which are incorporated herein by reference.

BACKGROUND OF THE INVENTION

1. Field of the Invention

The present invention relates to an optical transmitter in which optical transmission paths are optically coupled to another optical transmission path.

2. Description of the Related Art

Jpn. Pat. Appln. KOKAI Publication No. 2005-283917 discloses one example of a conventional optical transmitter. This optical transmitter is described with reference to FIG. 8 to FIG. 9. In this optical transmitter, light source holders 55, 56, and 57 are provided for emission optical transmission paths 50, 51, and 52 on one end. The light source holders 55, 56, and 57 are optically coupled to light sources 58, 59, and 60, respectively. The emission optical transmission paths 50, 51, and 52 are enclosed together on the other end by a single ferrule 53. The end faces of the emission optical transmission paths 50, 51, and 52 are provided to meet given positions in the end face of the ferrule 53. A reception transmission optical path 54 is located near the end face of the ferrule 53. The end face of the reception transmission optical path 54 faces the end faces of the emission optical transmission paths 50, 51, and 52. The emission optical transmission paths 50, 51, and 52 and the reception transmission optical path 54 are constituted by so-called optical fibers. Each of the optical fiber has a core serving as an optical path, and a clad enclosing the core. Light rays emitted from the light sources 58, 59, and 60 are guided into the emission optical transmission paths 50, 51, and 52, propagate through the emission optical transmission paths 50, 51, and 52, exit from the end faces of the emission optical transmission paths 50, 51, and 52, and enter the core of the reception transmission optical path 54, respectively.

Figure 8:
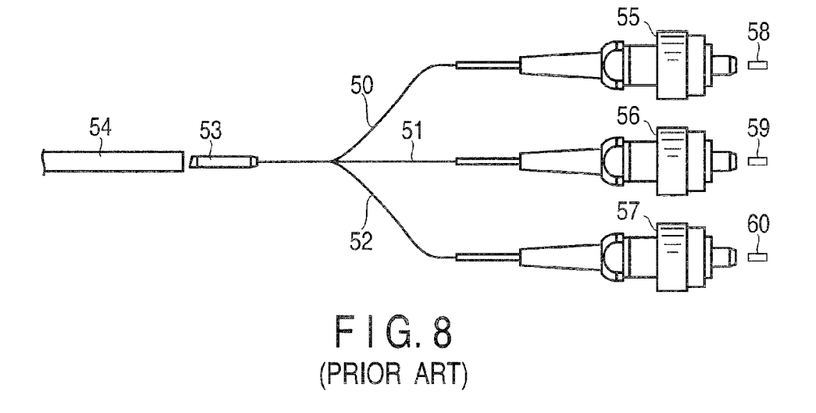
FIG. 8 shows an example of a conventional optical transmitter.
Figure 9:
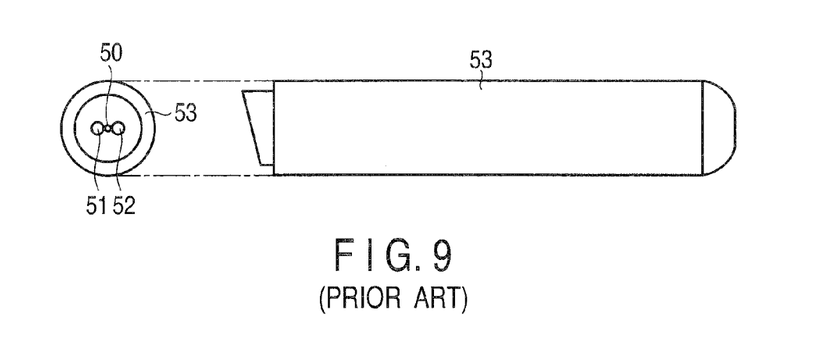
FIG. 9 shows a ferrule of FIG. 8.

An enclosing core diameter occupying the cores of the emission optical transmission paths 50, 51, and 52 exposed in the end face of the ferrule 53 at the end of an emission optical transmission path is equal to or less than the core diameter of the reception transmission path. Moreover, a numerical aperture (NA) determined by the refractive indexes of the core and clad of the reception transmission path is equal to or more than the maximum numerical aperture (NA) of each of the transmission paths 50, 51, and 52.

The ends of the emission optical transmission paths 50, 51, and 52 are enclosed by the single ferrule 53, and the end faces of the reception transmission optical paths are provided to meet the given positions in the end face of the ferrule. Thus, advantageously, the ends of the emission transmission optical paths are easy to handle and can be small-sized.

Figure 10:
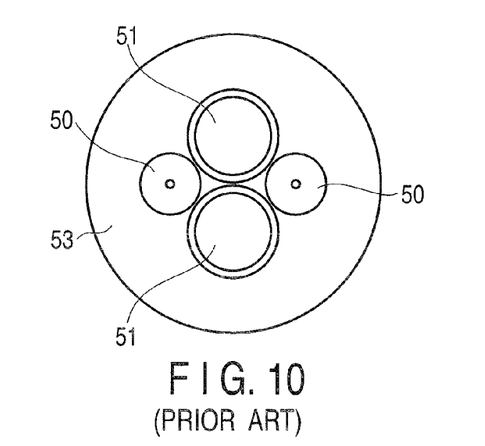
FIG. 10 shows the end face of the ferrule in another example of the conventional optical transmitter.

However, for structural reasons, the cores of the transmission paths 50, 51, and 52 cannot be brought closer beyond a certain distance because of the interference of the outside diameters of the clads. That is, for example, as shown in FIG. 10, the cores of the emission optical transmission paths 50 and 51 are apart from one another as much as at least the thickness of the clads of the emission optical transmission paths 50 and 51 even in a configuration in which the emission optical transmission paths 50 and 51 are adjacent to one another. Therefore, the reception transmission optical path 54 having a suitable core diameter can only be used. As a result, the reception transmission optical path is prevented from being reduced in diameter.

Figure 11:
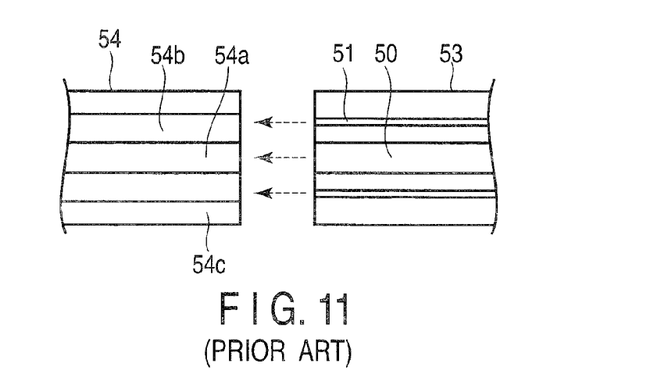
FIG. 11 shows light propagation from an emission transmission path to a reception transmission path in still another example of the conventional optical transmitter.

In the example shown in FIG. 11, the emission optical transmission paths 51 are arranged around the emission optical transmission path 50, and the ends of the emission optical transmission paths 50 and 51 are held by the ferrule 53. The reception transmission optical path 54 comprises two cores 54a and 54b that are coaxially disposed, and a clad 54c enclosing these cores. The end face of the reception transmission optical path 54 is disposed to face the end face of the ferrule 53. In this case as well, the core diameter of the reception transmission optical path 54 is larger than an enclosing core diameter occupying the cores of the emission optical transmission paths 50 and 51.

Figure 12:
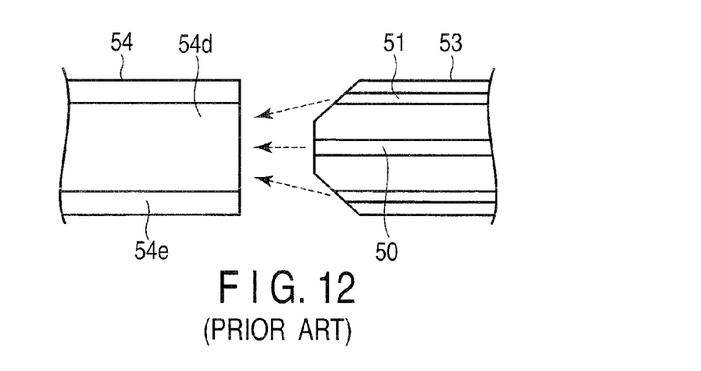
FIG. 12 shows light propagation from the emission transmission path to the reception transmission path in yet another example of the conventional optical transmitter.

Furthermore, in the example shown in FIG. 12, the reception transmission optical path 54 has a structure in which a single core 54d is enclosed by a clad 54e, and the peripheral edge of the end face of the ferrule 53 is slanted. In this configuration, a light ray exiting from the outside emission optical transmission path 51 exits inwardly at a slant. Thus, the reception transmission optical path 54 can be reduced in diameter as compared with the example in FIG. 11, but cannot be drastically reduced in diameter when coupling efficiency, for example, is considered.

BRIEF SUMMARY OF THE INVENTION

An object of the invention is to provide an optical transmitter allowing a reception transmission optical path to be reduced in diameter.

An optical transmitter according to an aspect of the invention includes three or more emission optical fibers that are three-dimensionally arranged, a single reception optical fiber, and an optical path converting component to optically couple the emission optical fibers to the reception optical fiber. The optical path converting component includes optical transmission portions that are optically coupled to the three or more emission optical fibers one to one, respectively, and optically coupled commonly to the single reception optical fiber. Entry ends of the optical transmission portions are aligned with exit ends of the three or more emission optical fibers, respectively. Exit ends of the optical transmission portions are aligned, as a whole, with an entry end of the single reception optical fiber. The exit ends of the optical transmission portions are arranged substantially parallel to one another and in closer proximity to one another than the entry ends of the optical transmission portions.

According to the invention, an optical transmitter allowing a reception transmission optical path to be reduced in diameter is provided.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter with reference to the drawings.

<First Embodiment>

Figure 1:
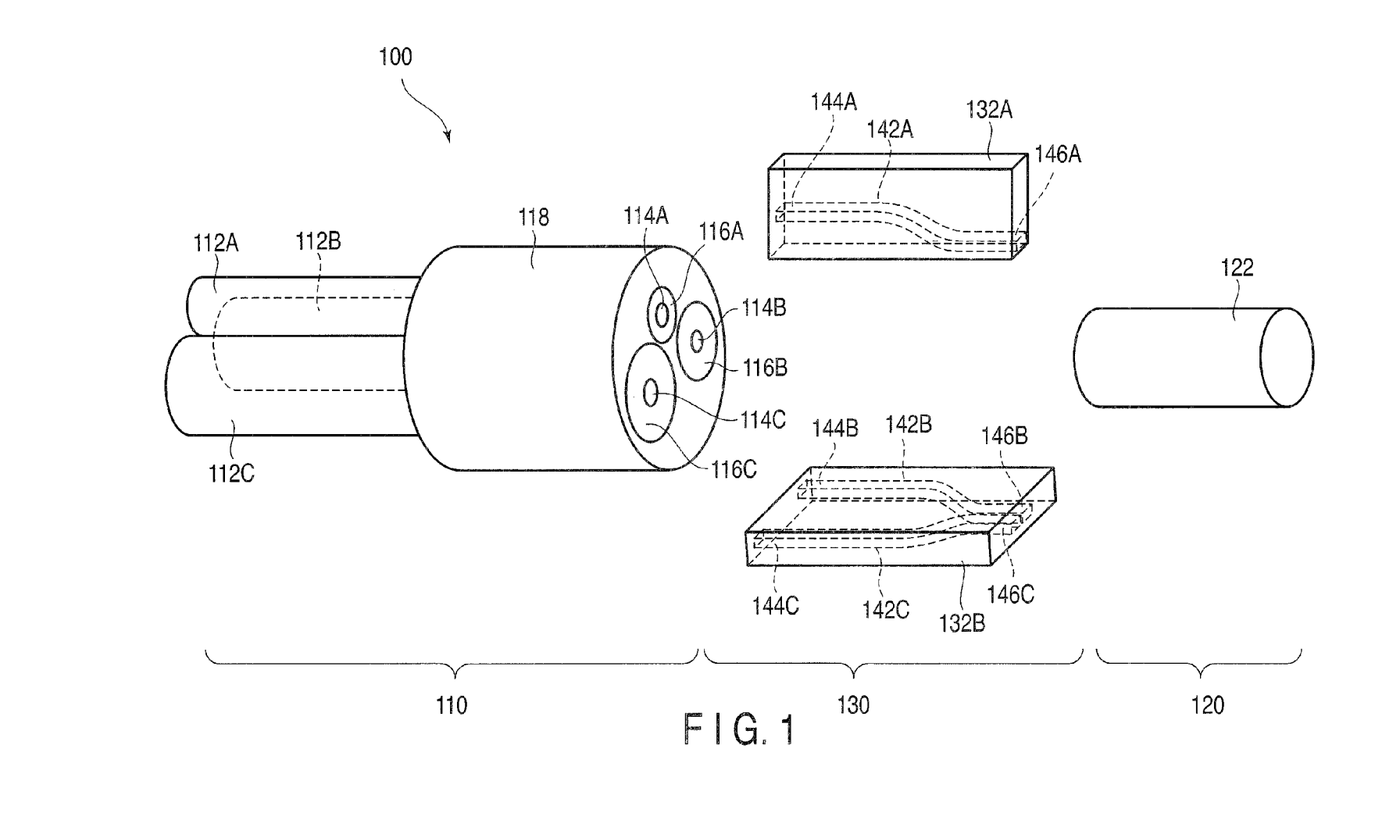
FIG. 1 is an exploded perspective view of an optical transmitter according to a first embodiment of the present invention.
Figure 2:
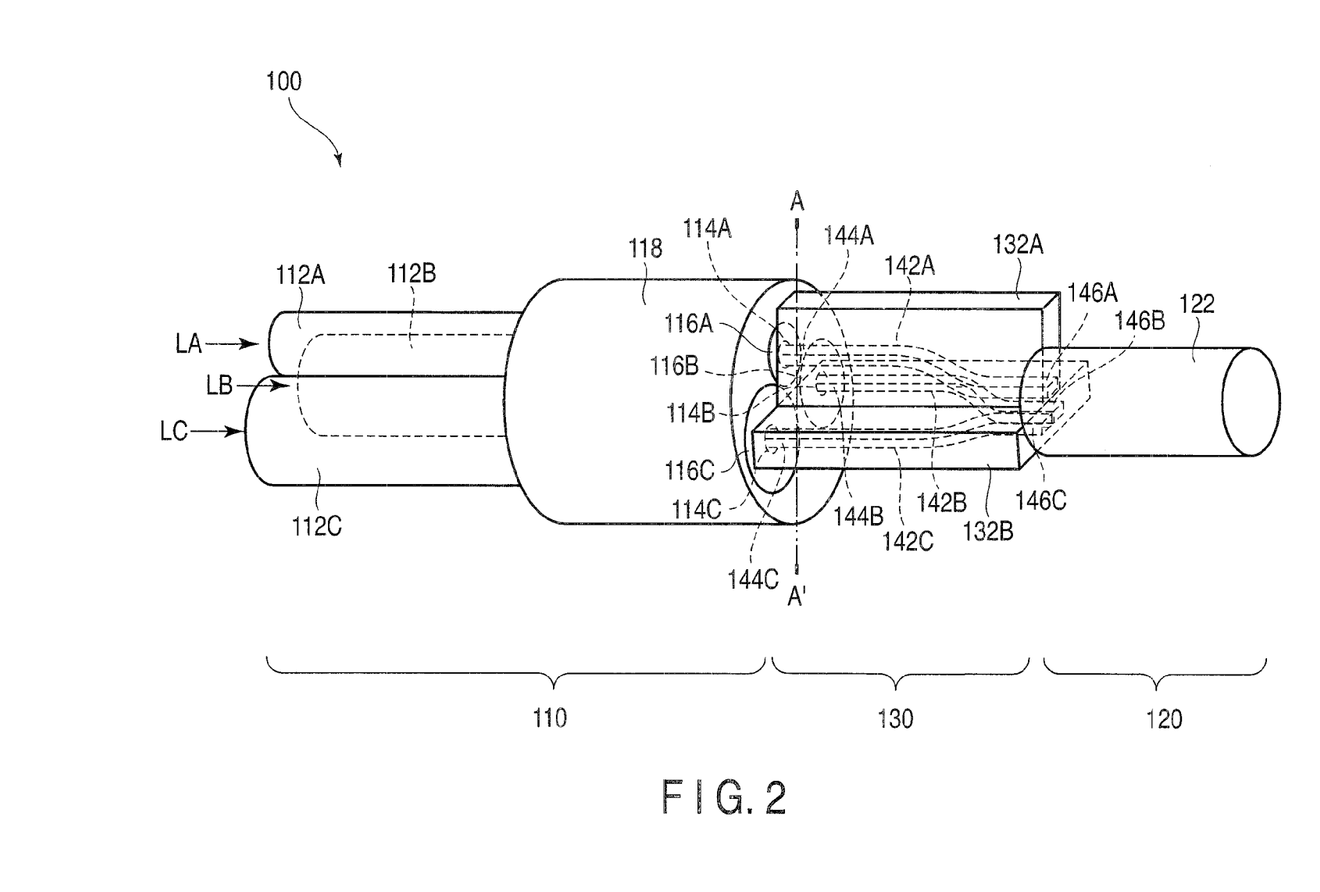
FIG. 2 is a perspective view of the assembled optical transmitter according to the first embodiment of the present invention.
Figure 3:
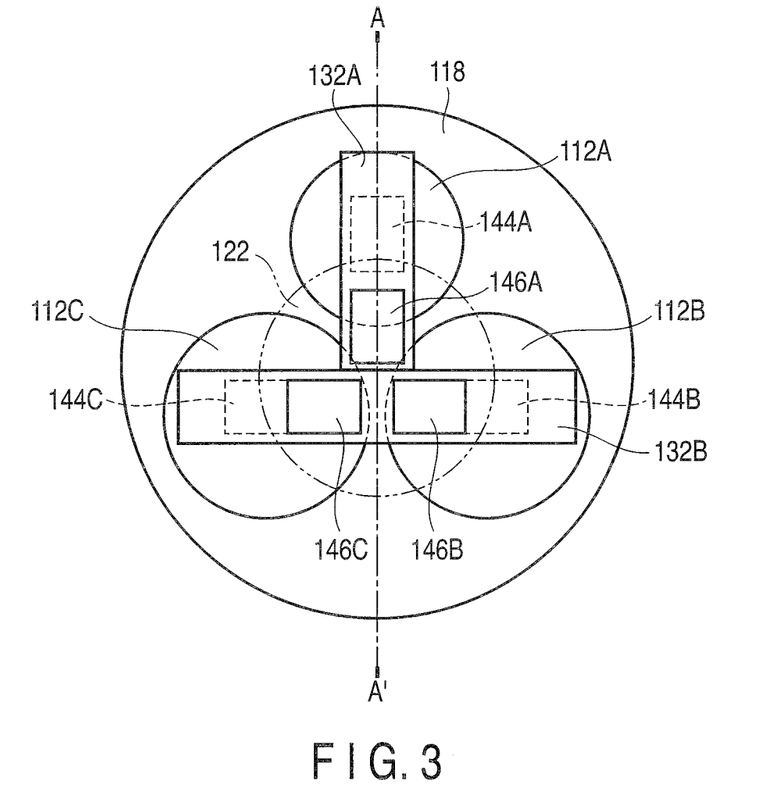
FIG. 3 is a diagram of the assembled optical transmitter according to the first embodiment of the present invention viewed from an exit side.
Figure 4:
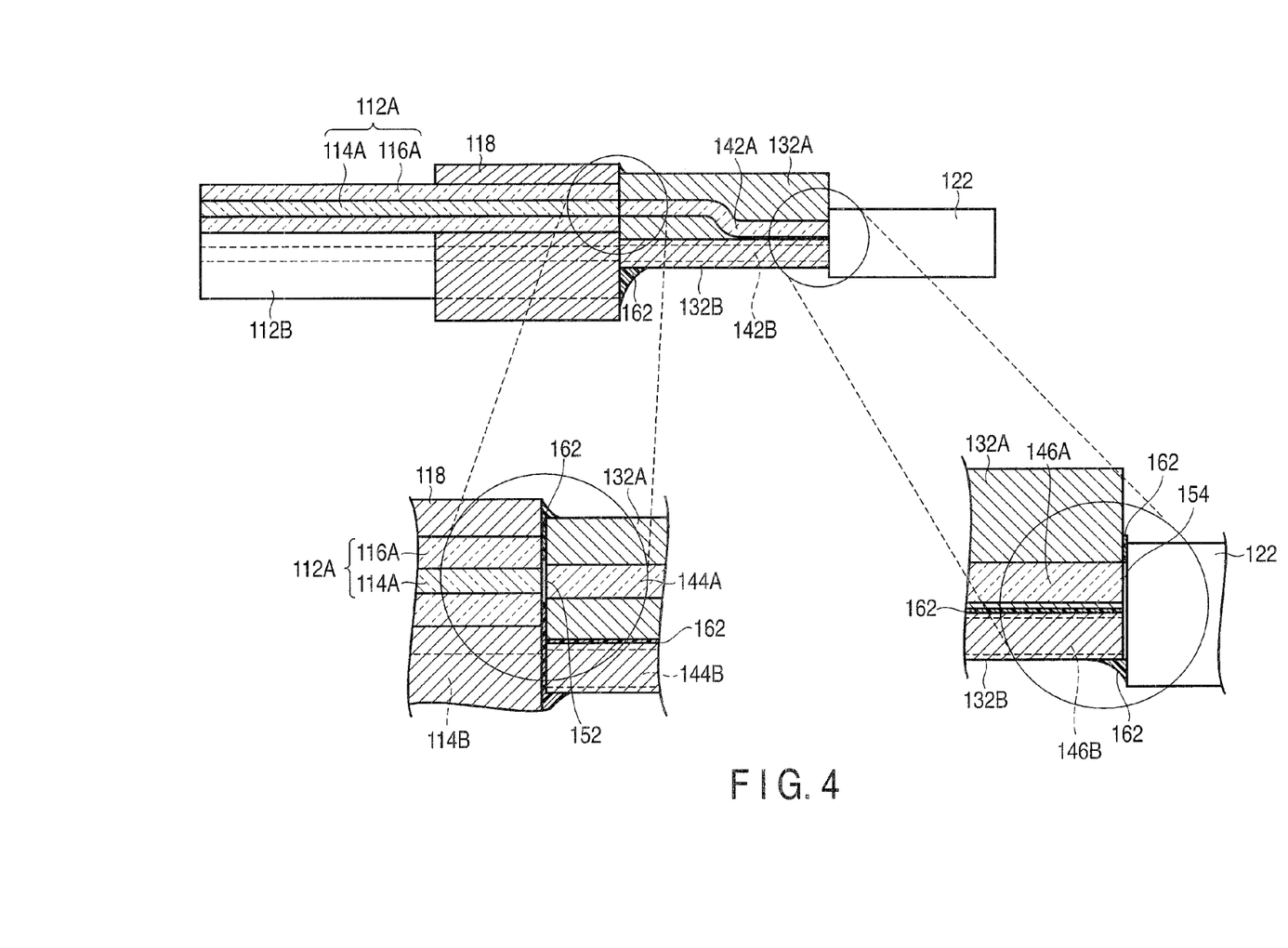
FIG. 4 is an A-A' sectional view of the optical transmitter according to the first embodiment of the present invention.

A first embodiment of the present invention is shown in FIG. 1 to FIG. 4. FIG. 1 shows an exploded perspective view of an optical transmitter according to a first embodiment of the present invention. FIG. 2 shows a perspective view of the assembled optical transmitter according to the first embodiment of the present invention. FIG. 3 shows a diagram of the assembled optical transmitter according to the first embodiment of the present invention viewed from an exit side. FIG. 4 shows an A-A' sectional view of the optical transmitter according to the first embodiment of the present invention.

(Configuration)

The configuration of the optical transmitter according to this embodiment is described with reference to FIG. 1 to FIG. 4.

As shown in FIG. 1 and FIG. 2, an optical transmitter 100 includes an emission optical transmission path section 110, a reception transmission optical path section 120, and an optical path converting component 130 to optically couple the emission optical transmission path section 110 to the reception transmission optical path section 120.

The emission optical transmission path section 110 includes emission optical fibers 112A, 112B, and 112C serving as three emission optical transmission paths. The three emission optical fibers 112A, 112B, and 112C are three-dimensionally arranged. In other words, the three emission optical fibers 112A, 112B, and 112C are not located on the same plane. Although the emission optical transmission path section 110 includes the three emission optical fibers 112A, 112B, and 112C in the example shown here, the emission optical transmission path section 110 may include more emission optical fibers. That is, the emission optical transmission path section 110 includes three or more emission optical fibers 112A, 112B, and 112C that are three-dimensionally arranged. Each of the emission optical fibers 112A, 112B, and 112C is, for example, a core-clad fiber. The core-clad fiber comprises a core, serving as an optical path, and a clad enclosing the core. The core is higher in refractive index than the clad. A light ray that has properly entered the core travels within the core, undergoing total internal reflection repeatedly at the interface between the core and the clad. That is, the emission optical fibers 112A, 112B, and 112C have such cores 114A, 114B, and 114C and clads 116A, 116B, and 116C, respectively.

The reception transmission optical path section 120 includes a reception optical fiber 122 serving as a single reception transmission optical path section. The reception optical fiber 122 is, for example, a single fiber. The single fiber is constituted by a single-wire transparent material, and this transparent material has a refractive index higher than that of the atmosphere. A light ray that has properly entered the single fiber travels within the single fiber, undergoing total internal reflection repeatedly on the outer peripheral surface of the single fiber, that is, at the interface between the transparent material and the atmosphere.

The optical path converting component 130 includes two rigid light guiding path substrates 132A and 132B. The rigid light guiding path substrate 132A has one optical transmission portion 142A, and the rigid light guiding path substrate 132B has two optical transmission portions 142B and 142C. In other words, the optical path converting component 130 has the optical transmission portions 142A, 142B, and 142C. These optical transmission portions 142A, 142B, and 142C are distributed to the two rigid light guiding path substrates 132A and 132B.

Each of the rigid light guiding path substrates 132A and 132B, which has a structure similar to that of the optical fiber, comprises a core serving as an optical path (i.e., an optical transmission portion), and a clad enclosing the core, the core having a refractive index higher than that of the clad. A light ray that has properly entered the core travels within the core, undergoing total internal reflection repeatedly at the interface between the core and the clad.

The optical transmission portions 142A, 142B, and 142C are optically coupled to the emission optical fibers 112A, 112B, and 112C one to one, respectively. That is, the optical transmission portion 142A is optically coupled to the emission optical fiber 112A, the optical transmission portion 142B is optically coupled to the emission optical fiber 112B, and the optical transmission portion 142C is optically coupled to the emission optical fiber 112C. The optical transmission portions 142A, 142B, and 142C are substantially equal in refractive index to the cores 114A, 114B, and 114C of the emission optical fibers 112A, 112B, and 112C, respectively. Moreover, the optical transmission portions 142A, 142B, and 142C are optically coupled commonly to the reception optical fiber 122. Each of the optical transmission portions 142A, 142B, and 142C is substantially equal in refractive index to the reception optical fiber 122.

In the following explanation, the ends of the optical fiber and the optical transmission portion that allow the light to enter are referred to as entry ends, and the ends that allow the light to exit are referred to as exit ends.

The exit ends of the emission optical fibers 112A, 112B, and 112C are held by a ferrule 118 in proximity to one another and substantially parallel to one another. The ferrule 118 has through-holes through which the emission optical fibers 112A, 112B, and 112C are inserted, respectively. When the exit ends of the emission optical fibers 112A, 112B, and 112C are inserted through these through-holes, the ferrule 118 holds the exit ends of the emission optical fibers 112A, 112B, and 112C at a distance from one another. The end face of the ferrule 118 to be optically coupled to the optical path converting component 130 is polished, and exposes the cores 114A, 114B, and 114C and clads 116A, 116B, and 116C of the emission optical fibers 112A, 112B, and 112C.

As shown in FIG. 2 and FIG. 3, entry ends 144A, 144B, and 144C of the optical transmission portions 142A, 142B, and 142C are aligned with the cores at the exit ends of the emission optical fibers 112A, 112B, and 112C, respectively. That is, the end faces of the entry ends 144A, 144B, and 144C of the optical transmission portions 142A, 142B, and 142C face the end faces of the cores at the exit ends of the emission optical fibers 112A, 112B, and 112C, respectively. The aperture widths of the entry ends 144A, 144B, and 144C of the optical transmission portions 142A, 142B, and 142C are equal to or more than the core diameters of the exit ends of the emission optical fibers 112A, 112B, and 112C, respectively. The end faces of the cores at the exit ends of the emission optical fibers 112A, 112B, and 112C entirely face the end faces of the entry ends 144A, 144B, and 144C of the optical transmission portions 142A, 142B, and 142C, respectively.

Furthermore, exit ends 146A, 146B, and 146C of the optical transmission portions 142A, 142B, and 142C are aligned, as a whole, with the entry end of the single reception optical fiber 122. That is, all of the end faces of the exit ends 146A, 146B, and 146C of the optical transmission portions 142A, 142B, and 142C face the end face at the entry end of the reception optical fiber 122. The reception optical fiber 122 has an outside diameter equal to or more than the diameter of a circumscribed circle of the exit ends 146A, 146B, and 146C of the optical transmission portions 142A, 142B, and 142C. The reception optical fiber 122 is located, for example, concentrically with the circumscribed circle.

The three optical transmission portions 142A, 142B, and 142C provided in the two rigid light guiding path substrates 132A and 132B are formed to be curved with desired curvatures in the planes of these substrates. The two rigid light guiding path substrates 132A and 132B are adjacently arranged to be in surface contact. The exit end 146A of the optical transmission portion 142A is located in closer proximity to a contact surface of the two rigid light guiding path substrates 132A and 132B than the entry end 144A of the optical transmission portion 142A. Moreover, the exit ends 146B and 146C of the two optical transmission portions 142B and 142C included in the rigid light guiding path substrate 132B are located in closer proximity to each other than the entry ends 144B and 144C. As a result, the exit ends 146A, 146B, and 146C of the optical transmission portions 142A, 142B, and 142C are located in closer proximity to one another than the entry ends 144A, 144B, and 144C of the optical transmission portions 142A, 142B, and 142C. In addition, the exit ends 146A, 146B, and 146C of the optical transmission portions 142A, 142B, and 142C are located substantially parallel to one another. That is, the exit ends 146A, 146B, and 146C are arranged so that the central axes thereof are substantially parallel to one another.

In the example shown in FIG. 3, the apertures of the entry ends 144A, 144B, and 144C of the optical transmission portions 142A, 142B, and 142C are the same size as the apertures of the exit ends 146A, 146B, and 146C of the optical transmission portions 142A, 142B, and 142C, respectively. However, the apertures of the entry ends 144A, 144B, and 144C and the apertures of the exit ends 146A, 146B, and 146C do not have to be the same size and may be differently sized. In another example, the apertures of the exit ends 146A, 146B, and 146C of the optical transmission portions 142A, 142B, and 142C are smaller than the apertures of the entry ends 144A, 144B, and 144C of the optical transmission portions 142A, 142B, and 142C, respectively.

As shown in FIG. 4, the two rigid light guiding path substrates 132A and 132B are fixed to each other by an adhesive agent 162. The two rigid light guiding path substrates 132A and 132B are also fixed to the ferrule 118 by the adhesive agent 162. The two rigid light guiding path substrates 132A and 132B are further fixed to the reception optical fiber 122 by the adhesive agent 162.

An index matching member 152 is disposed between the core 114A at the exit end of the emission optical fiber 112A and the entry end 144A of the optical transmission portion 142A to prevent air or a material having a different refractive index from intervening in an optical path between the core 114A of the emission optical fiber 112A and the optical transmission portion 142A. The index matching member 152 has substantially the same refractive index as the core 114A of the emission optical fiber 112A and the optical transmission portion 142A. The index matching member 152 comprises, for example, a matching oil. The matching oil is contained in a sealed state between the emission optical fiber 112A and the rigid light guiding path substrate 132A by the adhesive agent 162 lower in refractive index than the matching oil. The index matching member 152 is not exclusively the matching oil. The index matching member 152 has only to be an optically transparent material having substantially the same refractive index as the core of the emission optical fiber 112A and the optical transmission portion 142A. For example, the index matching member 152 may be an adhesive agent.

Although not shown in FIG. 4, index matching members are also disposed between the core 114B at the exit end of the emission optical fiber 112B and the entry end 144B of the optical transmission portion 142B and between the core 114C at the exit end of the emission optical fiber 112C and the entry end 144C of the optical transmission portion 142C. These index matching members have substantially the same refractive index as the cores 114B and 114C of the emission optical fibers 112B and 112C and the optical transmission portions 142B and 142C, respectively. In other respects, details of these index matching members are similar to details of the index matching member 152.

An index matching member 154 is disposed between the exit ends 146A and 146B of the optical transmission portions 142A and 142B and the entry end of the reception optical fiber 122. The index matching member 154 has substantially the same refractive index as the reception optical fiber 122 and the optical transmission portions 142A and 142B. The index matching member 154 comprises, for example, a matching oil. The matching oil is contained in a sealed state between the rigid light guiding path substrates 132A and 132B and the reception optical fiber 122 by the adhesive agent 162 lower in refractive index than the matching oil. The index matching member 154 is no more exclusively the matching oil than the index matching member 152 is. The index matching member 154 has only to be an optically transparent material having substantially the same refractive index as the optical transmission portions 142A and 142B and the reception optical fiber 122. For example, the index matching member 154 may be an adhesive agent.

Although not shown in FIG. 4, an index matching member is also disposed between the exit end 146C of the optical transmission portion 142C and the entry end of the reception optical fiber 122. This index matching member has substantially the same refractive index as the exit end 146C of the optical transmission portion 142C and the reception optical fiber 122. In other respects, details of this index matching member are similar to details of the index matching member 154.

(Function)

The function according to this embodiment is described with reference to FIG. 1 to FIG. 4.

For example, as shown in FIG. 2, laser light rays LA, LB, and LC are optically coupled to the cores 114A, 114B, and 114C of the emission optical fibers 112A, 112B, and 112C, respectively. The laser light rays LA, LB, and LC are, for example, visible light rays of different wavelengths emitted from unshown three different laser light sources, respectively. For example, the laser light rays LA, LB, and LC have wavelengths corresponding to red, green, and blue, which are three primary colors, respectively.

The laser light LA travels within the core 114A of the emission optical fiber 112A, exits from the exit end held by the ferrule 118, and enters the entry end 144A of the optical transmission portion 142A of the rigid light guiding path substrate 132A through the index matching member 152. Further, the laser light LA travels within the optical transmission portion 142A, exits from the exit end 146A, and enters the reception optical fiber 122 through the index matching member 154.

Similarly, the laser light LB travels within the core 114B of the emission optical fiber 112B, exits from the exit end held by the ferrule 118, and enters the entry end 144B of the optical transmission portion 142B of the rigid light guiding path substrate 132B through the index matching member. Further, the laser light LB travels within the optical transmission portion 142B, exits from the exit end 146B, and enters the reception optical fiber 122 through the index matching member 154.

Moreover, the laser light LC travels within the core 114C of the emission optical fiber 112C, exits from the exit end held by the ferrule 118, and enters the entry end 144C of the optical transmission portion 142C of the rigid light guiding path substrate 132B through the index matching member. Further, the laser light LC travels within the optical transmission portion 142C, exits from the exit end 146C, and enters the reception optical fiber 122 through the index matching member.

The exit ends 146A, 146B, and 146C of the optical transmission portions 142A, 142B, and 142C are arranged substantially parallel to one another, so that the laser light rays LA, LB, and LC exit substantially parallel to one another from the exit ends 146A, 146B, and 146C. Since the exit ends 146A, 146B, and 146C are located in proximity to one another, the laser light rays LA, LB, and LC which have exited from the exit ends 146A, 146B, and 146C enter the reception optical fiber 122 at positions close to one another. The laser light rays LA, LB, and LC which have entered the reception optical fiber 122 are scattered in the reception optical fiber 122 and thus propagate toward the exit end.

(Advantages)

This embodiment has the following specific advantages.

Since the exit ends 146A, 146B, and 146C of the optical transmission portions 142A, 142B, and 142C of the optical path converting component 130 are located in proximity to one another, the positions of the laser light rays LA, LB, and LC to enter the reception optical fiber 122 are close to one another. Thus, the reception optical fiber 122 serving as a reception optical transmission path can be reduced in diameter. Moreover, since the exit ends 146A, 146B, and 146C are arranged substantially parallel to one another, the laser light rays LA, LB, and LC exit substantially parallel to one another from the exit ends 146A, 146B, and 146C. Accordingly, the laser light rays LA, LB, and LC which have entered the reception optical fiber 122 are uniformly scattered and the colors thereof are mixed earlier. As a result, the optical path length of the reception optical fiber 122 can be short.

<Second Embodiment>

Figure 5:
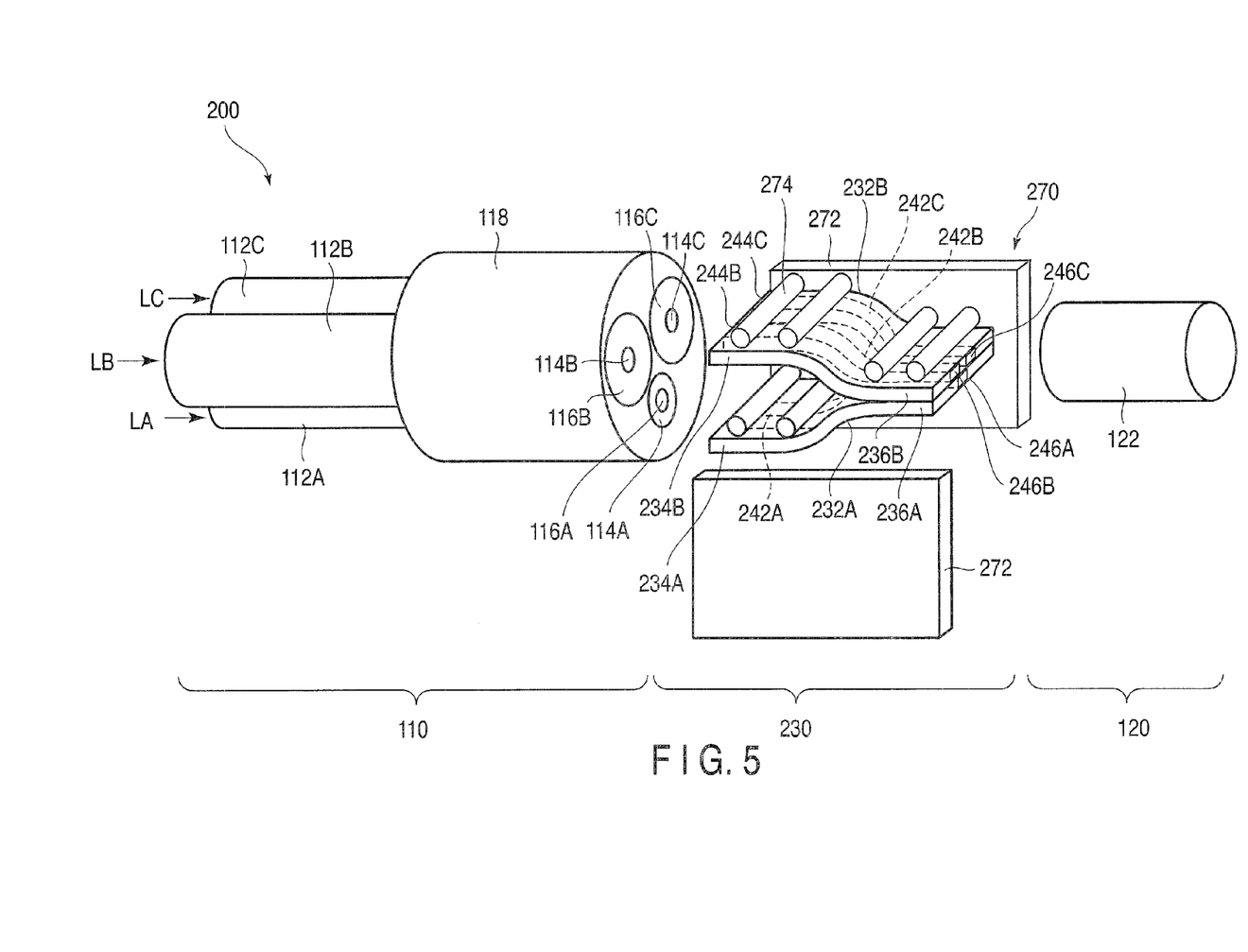
FIG. 5 is an exploded perspective view of an optical transmitter according to a second embodiment of the present invention.
Figure 6:
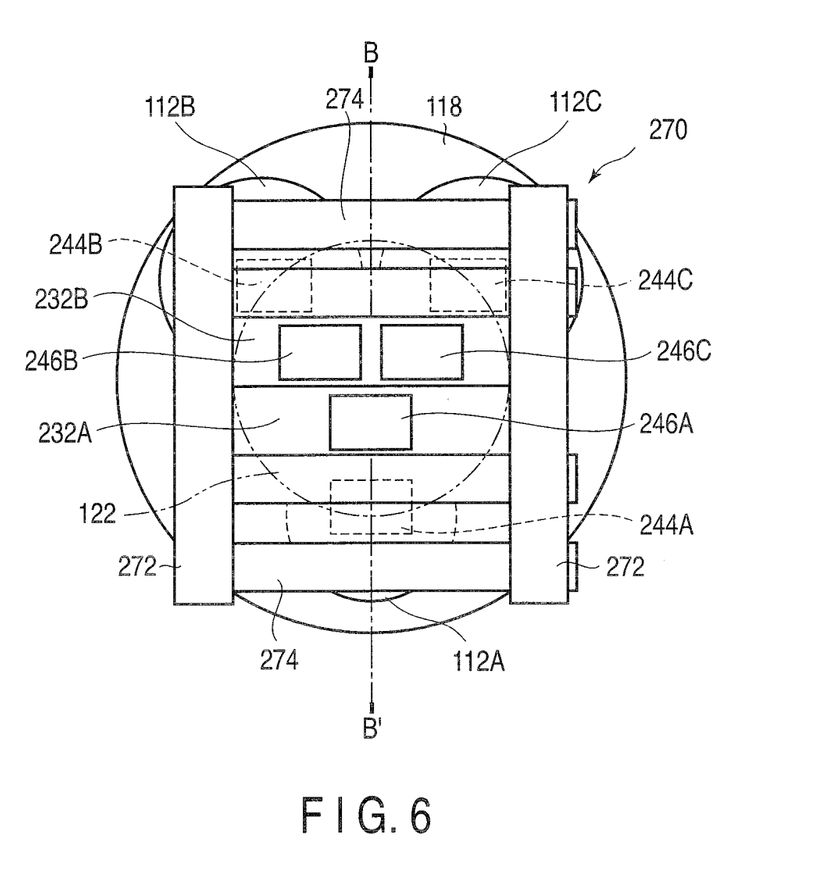
FIG. 6 is a diagram of the assembled optical transmitter according to the second embodiment of the present invention viewed from an exit side.
Figure 7:
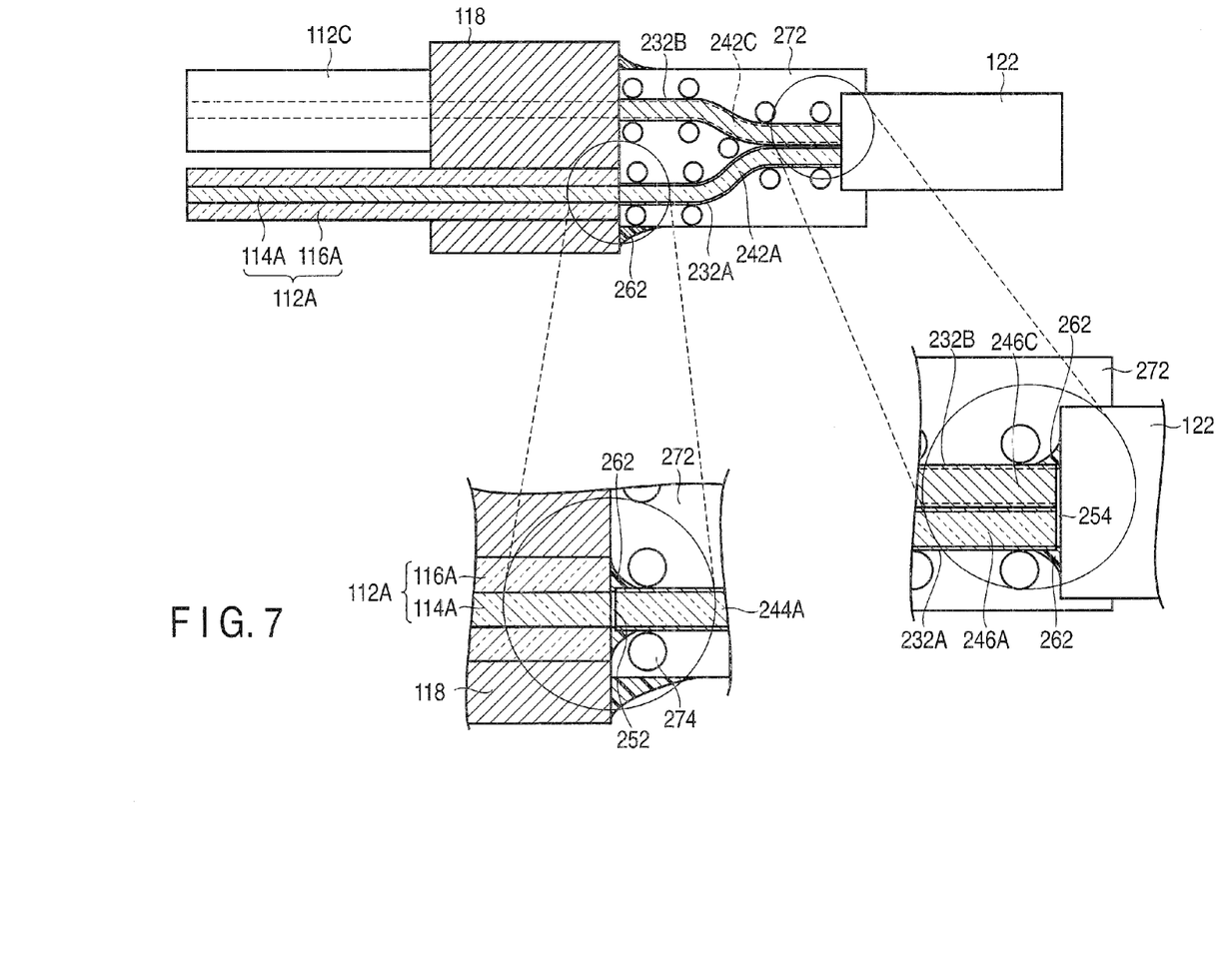
FIG. 7 is a B-B' sectional view of the optical transmitter according to the second embodiment of the present invention.

A second embodiment of the present invention is shown in FIG. 5 to FIG. 7. FIG. 5 shows an exploded perspective view of an optical transmitter according to the second embodiment of the present invention. FIG. 6 shows a diagram of the assembled optical transmitter according to the second embodiment of the present invention viewed from an exit side. FIG. 7 shows a B-B' sectional view of the optical transmitter according to the second embodiment of the present invention. In FIG. 5 to FIG. 7, components provided with the same reference numbers as the components shown in FIG. 1 to FIG. 4 are similar components and are not described in detail.

(Configuration)

The configuration of the optical transmitter according to this embodiment is described with reference to FIG. 5 to FIG. 7.

As shown in FIG. 5, an optical transmitter 200 includes an emission optical transmission path section 110, a reception transmission optical path section 120, and an optical path converting component 230 to optically couple the emission optical transmission path section 110 to the reception transmission optical path section 120. The emission optical transmission path section 110 and the reception transmission optical path section 120 are as has been described in the first embodiment. That is, the configuration of the optical transmitter 200 according to second embodiment is the same as the configuration of the optical transmitter 100 according to first embodiment except for the optical path converting component 230.

The optical path converting component 230 includes two flexible light guiding path substrates 232A and 232B. The flexible light guiding path substrate 232A has one optical transmission portion 242A, and the flexible light guiding path substrate 232B has two optical transmission portions 242B and 242C. In other words, the optical path converting component 230 has the optical transmission portions 242A, 242B, and 242C. These optical transmission portions 242A, 242B, and 242C are distributed to the two flexible light guiding path substrates 232A and 232B.

The flexible light guiding path substrates 232A and 232B are flexible and can be relatively freely bent. Each of the flexible light guiding path substrates 232A and 232B, which has a structure similar to that of an optical fiber, comprises a core serving as an optical path (i.e., an optical transmission portion), and a clad enclosing the core, the core having a refractive index higher than that of the clad. A light ray that has properly entered the core travels within the core, undergoing total internal reflection repeatedly at the interface between the core and the clad.

The optical transmission portions 242A, 242B, and 242C are optically coupled to emission optical fibers 112A, 112B, and 112C one to one, respectively. That is, the optical transmission portion 242A is optically coupled to the emission optical fiber 112A, the optical transmission portion 242B is optically coupled to the emission optical fiber 112B, and the optical transmission portion 242C is optically coupled to the emission optical fiber 112C. The optical transmission portions 242A, 242B, and 242C are substantially equal in refractive index to cores 114A, 114B, and 114C of the emission optical fibers 112A, 112B, and 112C, respectively. Moreover, the optical transmission portions 242A, 242B, and 242C are optically coupled commonly to a reception optical fiber 122.

Each of the optical transmission portions 242A, 242B, and 242C is substantially equal in refractive index to the reception optical fiber 122.

The optical path converting component 230 also has a holding member 270 to hold the two flexible light guiding path substrates 232A and 232B. The holding member 270 includes a pair of holding plates 272, and pins 274 fixed to the holding plates 272. The pins 274 extend between the pair of holding plates 272, and are fixed at both ends to the holding plates 272. The flexible light guiding path substrates 232A and 232B are inserted between the pins 274 and thereby fixed.

The holding member 270 holds the flexible light guiding path substrates 232A and 232B in such a manner as to curve these substrates with desired curvatures so that exit ends 236A and 236B of the flexible light guiding path substrates 232A and 232B in which exit ends 246A, 246B, and 246C of the optical transmission portions 242A, 242B, and 242C are arranged are located in closer proximity to each other than entry ends 234A and 234B of the flexible light guiding path substrates 232A and 232B in which entry ends 244A, 244B, and 244C of the optical transmission portions 242A, 242B, and 242C are arranged. Moreover, the exit ends 246B and 246C of the two optical transmission portions 242B and 242C included in the flexible light guiding path substrate 232B are located in closer proximity to each other than the entry ends 244B and 244C. In consequence, the exit ends 246A, 246B, and 246C of the optical transmission portions 242A, 242B, and 242C are located in closer proximity to one another than the entry ends 244A, 244B, and 244C of the optical transmission portions 242A, 242B, and 242C. Moreover, the exit ends 246A, 246B, and 246C of the optical transmission portions 242A, 242B, and 242C are arranged substantially parallel to one another. That is, the exit ends 246A, 246B, and 246C are arranged so that the central axes thereof are substantially parallel to one another.

Although the holding member 270 holds both of the two flexible light guiding path substrates 232A and 232B in a curved state in the example shown here, the holding member 270 may hold the two flexible light guiding path substrates 232A and 232B without curving one of these substrates. Moreover, although the optical path converting component 230 includes the two flexible light guiding path substrates 232A and 232B in the example shown, the optical path converting component 230 may include more flexible light guiding path substrates. That is, the holding member 270 holds at least one of the flexible light guiding path substrates in a curved state so that the exit ends of the flexible light guiding path substrates are located in closer proximity to one another than the entry ends of the flexible light guiding path substrates.

The entry ends 244A, 244B, and 244C of the optical transmission portions 242A, 242B, and 242C are aligned with the cores at the exit ends of the emission optical fibers 112A, 112B, and 112C, respectively. That is, the end faces of the entry ends 244A, 244B, and 244C of the optical transmission portions 242A, 242B, and 242C face the end faces of the cores at the exit ends of the emission optical fibers 112A, 112B, and 112C, respectively. The aperture widths of the entry ends 244A, 244B, and 244C of the optical transmission portions 242A, 242B, and 242C are equal to or more than the core diameters of the exit ends of the emission optical fibers 112A, 112B, and 112C, respectively. The end faces of the cores at the exit ends of the emission optical fibers 112A, 112B, and 112C entirely face the end faces of the entry ends 244A, 244B, and 244C of the optical transmission portions 242A, 242B, and 242C, respectively.

Furthermore, the exit ends 246A, 246B, and 246C of the optical transmission portions 242A, 242B, and 242C are aligned, as a whole, with the entry end of the single reception optical fiber 122. That is, all of the end faces of the exit ends 246A, 246B, and 246C of the optical transmission portions 242A, 242B, and 242C face the end face at the entry end of the reception optical fiber 122. The reception optical fiber 122 has an outside diameter equal to or more than the diameter of a circumscribed circle of the exit ends 246A, 246B, and 246C of the optical transmission portions 242A, 242B, and 242C. The reception optical fiber 122 is located, for example, concentrically with the circumscribed circle.

In the example shown in FIG. 6, the apertures of the entry ends 244A, 244B, and 244C of the optical transmission portions 242A, 242B, and 242C are the same size as the apertures of the exit ends 246A, 246B, and 246C of the optical transmission portions 242A, 242B, and 242C, respectively. However, the apertures of the entry ends 244A, 244B, and 244C and the apertures of the exit ends 246A, 246B, and 246C do not have to be the same size and may be differently sized. In another example, the apertures of the exit ends 246A, 246B, and 246C of the optical transmission portions 242A, 242B, and 242C are smaller than the apertures of the entry ends 244A, 244B, and 244C of the optical transmission portions 242A, 242B, and 242C, respectively.

As shown in FIG. 7, the two flexible light guiding path substrates 232A and 232B and the holding plates 272 are fixed to a ferrule 118 by an adhesive agent 262. The two flexible light guiding path substrates 232A and 232B are also fixed to the reception optical fiber 122 by the adhesive agent 262. Although not shown, the reception optical fiber 122 is fixed to the holding plates 272 by the adhesive agent.

An index matching member 252 is disposed between the core 114A at the exit end of the emission optical fiber 112A and the entry end 244A of the optical transmission portion 242A to prevent air or a material having a different refractive index from intervening in an optical path between the core 114A of the emission optical fiber 112A and the optical transmission portion 242A. The index matching member 252 has substantially the same refractive index as the core 114A of the emission optical fiber 112A and the optical transmission portion 242A. The index matching member 252 comprises, for example, a matching oil. The matching oil is contained in a sealed state between the emission optical fiber 112A and the flexible light guiding path substrate 232A by the adhesive agent 262 lower in refractive index than the matching oil. The index matching member 252 is not exclusively the matching oil. The index matching member 252 has only to be an optically transparent material having substantially the same refractive index as the core 114A of the emission optical fiber 112A and the optical transmission portion 242A. For example, the index matching member 252 may be an adhesive agent.

Although not shown in FIG. 7, index matching members are also disposed between the cores 114B and 114C at the exit ends of the emission optical fibers 112B and 112C and the entry ends 244B and 244C of the optical transmission portions 242B and 242C, respectively. These index matching members have substantially the same refractive index as the cores 114B and 114C of the emission optical fibers 112B and 112C and the optical transmission portions 242B and 242C, respectively. In other respects, details of these index matching members are similar to details of the index matching member 252.

An index matching member 254 is disposed between the exit ends 246A and 246C of the optical transmission portions 242A and 242C and the entry end of the reception optical fiber 122. The index matching member 254 has substantially the same refractive index as the reception optical fiber 122 and the optical transmission portions 242A and 242C. The index matching member 254 comprises, for example, a matching oil. The matching oil is contained in a sealed state between the flexible light guiding path substrates 232A and 232B and the reception optical fiber 122 by the adhesive agent 262 lower in refractive index than the matching oil. The index matching member 254 is no more exclusively the matching oil than the index matching member 252 is. The index matching member 254 has only to be an optically transparent material having substantially the same refractive index as the optical transmission portions 242A and 242C and the reception optical fiber 122. For example, the index matching member 254 may be an adhesive agent.

Although not shown in FIG. 7, an index matching member is also disposed between the exit end 246B of the optical transmission portion 242B and the entry end of the reception optical fiber 122. This index matching member has substantially the same refractive index as the exit end 246B of the optical transmission portion 242B and the reception optical fiber 122. In other respects, details of this index matching member are similar to details of the index matching member 254.

(Function)

The function according to this embodiment is described with reference to FIG. 5 to FIG. 7.

As shown in FIG. 5, laser light rays LA, LB, and LC are optically coupled to the cores 114A, 114B, and 114C of the emission optical fibers 112A, 112B, and 112C, respectively. The laser light rays LA, LB, and LC are, for example, visible light rays of different wavelengths emitted from not shown three different laser light sources, respectively.

The laser light LA travels within the core 114A of the emission optical fiber 112A, exits from the exit end held by the ferrule 118, and enters the entry end 244A of the optical transmission portion 242A of the flexible light guiding path substrate 232A through the index matching member 252. Further, the laser light LA travels within the optical transmission portion 242A, exits from the exit end 246A, and enters the reception optical fiber 122 through the index matching member 254.

Similarly, the laser light LB travels within the core 114B of the emission optical fiber 112B, exits from the exit end held by the ferrule 118, and enters the entry end 244B of the optical transmission portion 242B of the flexible light guiding path substrate 232B through the index matching member. Further, the laser light LB travels within the optical transmission portion 242B, exits from the exit end 246B, and enters the reception optical fiber 122 through the index matching member 254.

Moreover, the laser light LC travels within the core 114C of the emission optical fiber 112C, exits from the exit end held by the ferrule 118, and enters the entry end 244C of the optical transmission portion 242C of the flexible light guiding path substrate 232B through the index matching member. Further, the laser light LC travels within the optical transmission portion 242C, exits from the exit end 246C, and enters the reception optical fiber 122 through the index matching member.

The exit ends 246A, 246B, and 246C of the optical transmission portions 242A, 242B, and 242C are arranged substantially parallel to one another, so that the laser light rays LA, LB, and LC exit substantially parallel to one another from the exit ends 246A, 246B, and 246C. Since the exit ends 246A, 246B, and 246C are located in proximity to one another, the laser light rays LA, LB, and LC which have exited from the exit ends 246A, 246B, and 246C enter the reception optical fiber 122 at positions close to one another. The laser light rays LA, LB, and LC which have entered the reception optical fiber 122 are scattered in the reception optical fiber 122 and thus propagate toward the exit end.

(Advantages)

This embodiment has the following specific advantages.

Since the exit ends 246A, 246B, and 246C of the optical transmission portions 242A, 242B, and 242C of the optical path converting component 230 are located in proximity to one another, the positions of the laser light rays LA, LB, and LC to enter the reception optical fiber 122 are close to one another. Thus, the reception optical fiber 122 serving as a reception optical transmission path can be reduced in diameter. Moreover, since the exit ends 246A, 246B, and 246C are arranged substantially parallel to one another, the laser light rays LA, LB, and LC exit substantially parallel to one another from the exit ends 246A, 246B, and 246C. Accordingly, the laser light rays LA, LB, and LC which have entered the reception optical fiber 122 are uniformly scattered and the colors thereof are mixed earlier. As a result, the optical path length of the reception optical fiber 122 can be short. Moreover, the flexible light guiding path substrates 232A and 232B fixed to the ferrule 118 and the reception optical fiber 122 are relatively low in mechanical strength. However, the ferrule 118 and the reception optical fiber 122 are also fixed to the holding member 270 and can therefore have high mechanical strength.

While the embodiments of the present invention have been described above with reference to the drawings, the present invention is not limited to these embodiments, and various changes and modifications can be made to the invention without departing from the spirit thereof.

What is claimed is:

1. An optical transmitter comprising:
   three or more emission optical fibers that are three-dimensionally arranged;
   a single reception optical fiber; and
   an optical path converting component to optically couple the emission optical fibers to the reception optical fiber,
   the optical path converting component including optical transmission portions that are optically coupled to the three or more emission optical fibers one to one, respectively, and optically coupled commonly to the single reception optical fiber, entry ends of the optical transmission portions being aligned with exit ends of the three or more emission optical fibers, respectively, exit ends of the optical transmission portions being aligned, as a whole, with an entry end of the single reception optical fiber, the exit ends of the optical transmission portions being arranged substantially parallel to one another and in closer proximity to one another than the entry ends of the optical transmission portions;
   wherein the optical path converting component comprises rigid light guiding path substrates to which the optical transmission portions are distributed, the rigid light guiding path substrates being adjacently arranged to be in surface contact, the exit ends of the optical transmission portions being located in closer proximity to a contact surface of the rigid light guiding path substrates than the entry ends of the optical transmission portions.

2. The optical transmitter according to claim 1, wherein the at least one of the rigid light guiding path substrates includes two or more optical transmission portions, exit ends of the two or more optical transmission portions included in the one rigid light guiding path substrate being located in closer proximity to one another than entry ends thereof.

3. The optical transmitter according to claim 2, wherein each of the emission optical fibers is a core-clad fiber, and the aperture widths of the entry ends of the optical transmission portions are equal to or more than the core diameters of the exit ends of the corresponding emission optical fibers, respectively.

4. The optical transmitter according to claim 3, wherein the aperture of the exit end of each of the optical transmission portions is smaller than the aperture of the entry end of the optical transmission portion.

5. The optical transmitter according to claim 2, wherein a first index matching member is disposed between the exit end of the emission optical fiber and the entry ends of the optical transmission portions, the first index matching member having substantially the same refractive index as the emission optical fiber and the optical transmission portions, and a second index matching member is disposed between the exit ends of the optical transmission portions and the entry end of the reception optical fiber, the second index matching member having substantially the same refractive index as the reception optical fiber and the optical transmission portions.

* * * * *